(12) United States Patent
Byun

(10) Patent No.: US 6,676,881 B1
(45) Date of Patent: Jan. 13, 2004

(54) APPARATUS FOR PRODUCING MULTIPLE CHANNEL DUCT ASSEMBLY AND METHOD THEREOF

(76) Inventor: Moo-Won Byun, 102-1306, Hyundai Apt. 39/7, 413-1, Poongnap-dong, Songpa-gu, Seoul (KR), 138-040

( * ) Notice: Subject to any disclaimer, the term of this patent is extended or adjusted under 35 U.S.C. 154(b) by 0 days.

(21) Appl. No.: 10/019,616

(22) PCT Filed: May 13, 2000

(86) PCT No.: PCT/KR00/00456

§ 371 (c)(1),
(2), (4) Date: Dec. 28, 2001

(87) PCT Pub. No.: WO01/02155

PCT Pub. Date: Jan. 11, 2001

(30) Foreign Application Priority Data

Jun. 30, 1999 (KR) .......................................... 1999-26147
Oct. 30, 1999 (KR) .......................................... 1999-47832

(51) Int. Cl.[7] .......................... B29C 49/20; B29C 49/04
(52) U.S. Cl. ........................ 264/508; 264/515; 264/516; 264/571; 425/112; 425/114; 425/327; 425/336
(58) Field of Search ................................. 264/508, 571, 264/515, 516; 425/112, 114, 327, 336, 326.1, 392

(56) References Cited

U.S. PATENT DOCUMENTS

| | | | |
|---|---|---|---|
| 3,629,030 A | * | 12/1971 | Ash .............................. 156/189 |
| 5,049,224 A | * | 9/1991 | Umezawa et al. ........... 156/294 |
| 5,405,569 A | * | 4/1995 | Lupke .......................... 264/504 |

FOREIGN PATENT DOCUMENTS

| | | |
|---|---|---|
| JP | 60247610 | 12/1985 |
| JP | 5042585 | 2/1993 |

* cited by examiner

*Primary Examiner*—Suzanne E. McDowell
(74) *Attorney, Agent, or Firm*—Madson & Metcalf

(57) ABSTRACT

The present invention resides in that a plurality of pre-molded inner ducts are fed to a cross-head die, and a melted outer duct is extruded around the inner ducts from the cross-head die, and then the pre-molded inner ducts and a melted outer duct are supplied into the corrugated tunnel of a molding die in which a melted outer duct is molded to have corrugations, thus producing a multiple channel duct assembly which includes a plurality of elongated inner ducts and a corrugated outer duct which encircles the inner ducts over their entire length to retain them. This method of continuously manufacturing a multiple channel duct assembly by using an extrusion molding machine with a cross-head die and a molding means has not been known heretofore.

12 Claims, 14 Drawing Sheets

APPARATUS FOR PRODUCING MULTIPLE CHANNEL DUCT ASSEMBLY AND METHOD THEREOF

BACKGROUND OF THE INVENTION

I. Field of the Invention

This invention relates to an apparatus for producing a duct and a method thereof, which is provided for containing long runs of optical fibers, electric wires or the likes disposed in underground networks. More particularly, the invention relates to an apparatus for producing a multiple channel duct assembly and a method thereof, which includes a plurality of contiguous ducts adapted for the containment of lengthy runs of for optical fibers, electric wires or the likes.

II. Description of the Prior Art

In the ground network industry, the proper design and installation of fiber optic cables or electric wires is critical to maintaining the integrity of information or the electric energy carried by such cables. Due to the delicate nature of the optic fibers or electric wires themselves, there is a need to protect the fibers or the electric wires from external sources of stress, such as temperature, pressure and contact with contaminating substances. As a result, most of the innovation in this industry has been directed to devising certain combinations of coverings to surround the optical fibers or electric wires. Therefore, a brief discussion of a method of installing fiber optic cable follows.

A multiple channel duct disclosed in U.S. Pat. No. 4,741,593, comprises a plurality of corrugated inner ducts contiguous, co-directionally extending, substantially parallel, in abutting contact with each other, each of said inner duct having a series of encircling contiguous convolutions extending over the length, being made up of contiguous ridges and troughs; and a flexible, synthetic resin overwrap sheath consisting of a sheath of rigid polyvinylchloride having a thickness of about 5 mils to about 15 mils, said sheath of rigid polyvinylchloride encircling and jacketing the corrugated inner ducts over their entire length to retain them in their contiguous relationship.

The above mentioned reference says that this type of multiple channel duct is flexible and can be coiled around relatively large reels. A great length of said multiple channel duct be coiled on the reel for lay out into an underground communications pipe, or can be reeled into a trench for direct burial. This type of multiple channel duct allows an overall reduction in fiber optic cable installation costs, and the manifolding aspect of the system maintains high structural integrity over the entire length of the conduit sections, and affords enhanced moisture protection to the entire system by reason of the overwrap employed. These advantages are the most desirable attributes in the cable duct for optical fibers, electric wires or the likes.

However, I have not found this type of multiple channel duct is sold in real cable duct market until now. The reason, I believe, is why this type of multiple channel duct has critical deficiencies in strength or flexibility in reality, which have not been found by the inventor at first. It is well known fact that although the inner duct of plastic with relatively small diameter, even though non-corrugated, is so flexible that it can be coiled around transportable reels, the non-corrugated outer duct of plastic with relatively large diameter is not so flexible that it can not be coiled around transportable reels.

The above-mentioned multiple channel duct include a plurality of corrugated inner ducts of plastic and a non-corrugated outer duct of plastic. Therefore, it is easily understood that the above mentioned multiple channel duct is not so flexible that it can not be coiled around transportable reels. I believe that this deficiency is one of the reasons why this type of multiple channel duct can not be founded in real cable market.

A current method of installing fiber optic cables is disclosed in U.S. Pat. No. 5,027,864. That reference involves the use of a hollow outer duct, typically constructed of polyvinylchloride (PVC) in forty foot lengths, which provides the first level of protection from the elements underground. This outer duct acts as a conduit for the passage of a number of smaller tubes, or "inner ducts" typically constructed of polyethylene in continuously long run lengths, which provides the second level of protection from the elements underground. Each of these inner ducts has a number of external longitudinally extending ribs, and each inner duct may contain a single fiber optic cable or a plurality of such cables.

The method of installing the cables first requires the introduction of the inner ducts through the outer duct by pulling the inner ducts from a spool located on the surface. From an underground work area, a gripper is attached to one end of each inner duct, after which the inner ducts are drawn through the outer duct until they reside completely within the outer duct. Once the inner ducts are in place, the fiber optic cables are then drawn through each of the inner ducts by a pull string blown through each of the inner ducts. The resulting assembly, therefore, comprises a single fiber optic cable or a plurality of fiber optic cables within each of several inner ducts, with the inner ducts being surrounded by the protective outer duct. The ribbed design of the inner ducts is to purports to facilitate the installation and removal of cables for maintenance and repair.

While the above described method of installation and housing of fiber optic cables does provide a certain level of convenience for maintenance and construction workers, as well as protection for the cables themselves, several deficiencies are apparent.

First, the material used for fabrication of the outer ducts, i.e. PVC, does not afford the flexibility for use with spools in lengths greater than forty feet. Thus, the labor costs in connecting segments of outer duct every forty feet adds a tremendous cost element to the overall project budget. Second, each outer duct connection site adds a point of structural weakness to the series of segments, as well as a site of possible contaminant infiltration from underground sources.

Further, the insertion of the inner ducts through the outer duct imposes a substantial increase in installation costs, in terms of labor.

The other type of multiple channel duct is disclosed in U.S. Pat. No. 5,692,545. That reference involves a cable duct for protecting communication cable comprising an elongated body portion having a first end and a second end, the body portion further including a longitudinal axis extending between the first end and the second end; and at least two passageways formed completely through the body portion and extending substantially parallel to the longitudinal axis, each of the passageways having a cross sectional area sufficient to loosely contain at least one communication cable; wherein said body portion is constructed from a combination of materials including plastic and crumb rubber.

This type of multiple channel duct eliminates the inner ducts altogether, allowing extrusion of a duct to much greater lengths, and installation of such ducts from spools. Therefore this type of duct also has advantages in minimizing the number of connections required between segments of the duct and other protective attributes of the duct and increase the data transmission integrity of the cables themselves.

However, this type of duct might have deficiencies inherent in construction from a combination of materials including plastic and crumb rubber. As described in the specification of said reference, if greater rigidity in said duct is required, a greater percentage of plastic may be added. Conversely, if greater flexibility is desired, a greater percentage of crumb rubber would likely provide the necessary flexion.

Therefore, It is difficult to meet the strict needs of strength and flexibility at the same time in this type of multiple channel duct. Besides, It is easily foreseen that this type of multiple channel duct with greater percentage of crumb rubber will has passageways with less smoothness on its inside surfaces. These might be critical deficiencies in field of cable ducts, through which fiber optic cables, electric wires or the likes are inserted.

SUMMARY OF THE INVENTION

It is an object of this invention to provide an apparatus and a method of producing a multiple channel duct assembly which enables quicker installation of fiber optic cables, electric wires or the likes thus reducing labor and material costs substantially over the prior art.

It is another object of this invention to provide an apparatus and a method of producing a multiple channel duct assembly which reduces the number of connections required between the duct segments themselves and has greater strength as well as greater flexibility at the same time.

It is still another object of this invention to provide an apparatus and a method of producing a multiple channel duct assembly, which includes inner ducts with sufficiently smooth inner surfaces.

These and other objects and advantages of the present invention will no doubt become apparent to those skilled in the art after having read the following description of the embodiments which are contained in and illustrated by the various drawing figures.

BEST MODE FOR CARRYING OUT THE INVENTION

Figure 1:
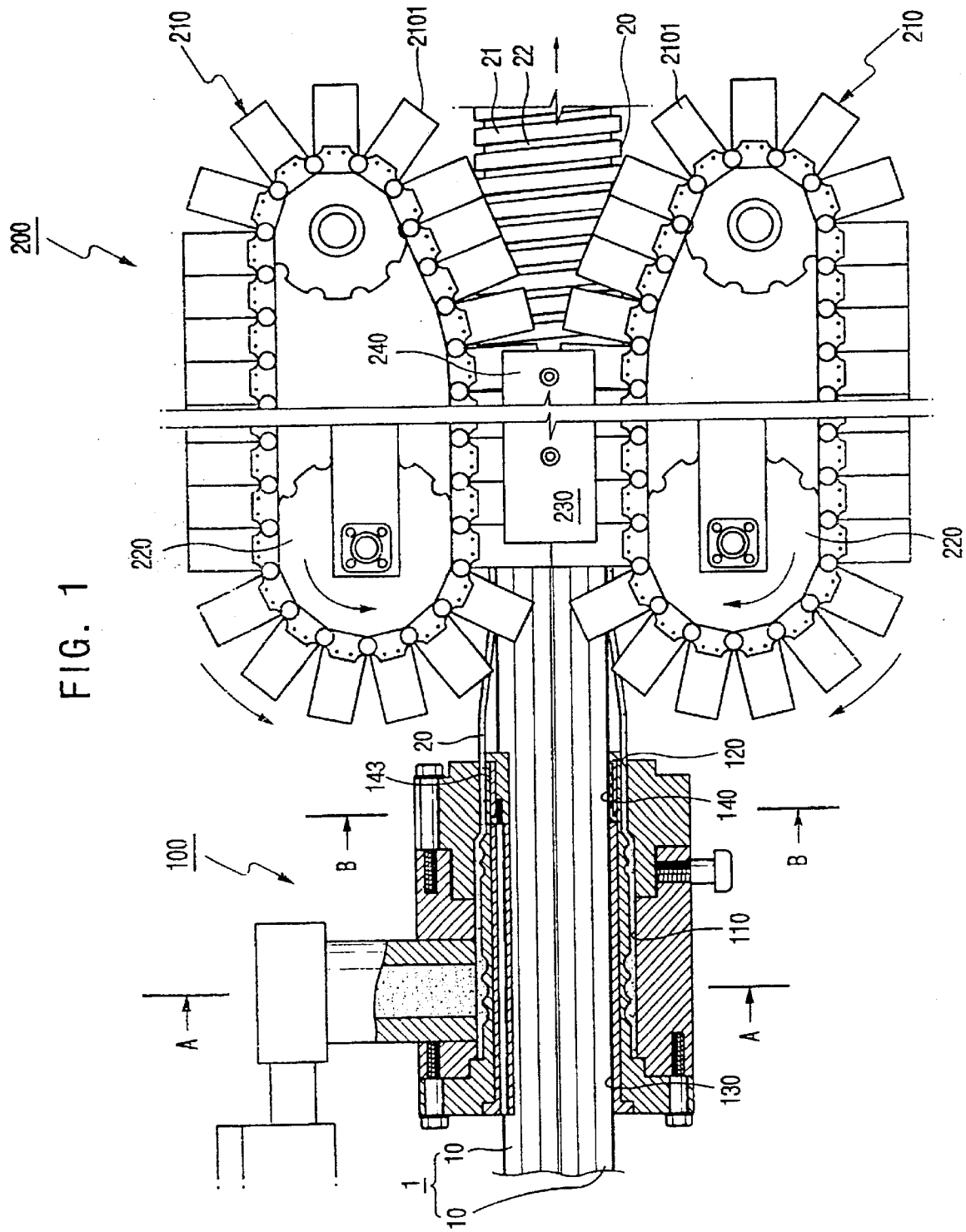
FIG. 1 is a partially sectional view of an apparatus according to an embodiment of the invention, illustrating a method of producing a multiple channel duct assembly in accordance with the present invention.

An apparatus for producing the multiple channel duct assembly includes a cross-head die 100, and a molding means 200 in common. As shown in FIG. 1, the apparatus used for continuously producing the multiple channel duct assembly has a cross-head die 100 including an outer duct resin passage 110 and a discharge port 120 capable of extruding a melted mass for a outer duct of thermoplastic resin.

The cross-head die 100 also have an inner duct insertion passage 130 capable of feeding a plurality of elongated inner ducts 10 that has separately been re-molded of thermoplastic resin, centrally through the outer duct resin passage.

According to a producing method of the present invention, a bundle of elongate inner ducts 10 are continuously fed through the inner duct inserting passage 130, while the melted mass of thermoplastic resin flowing from the outer duct resin passage 110 is being discharged from the discharge port 120 to extrude the outer duct around the bundle of inner ducts 10 as shown in FIG. 1.

Figure 4:
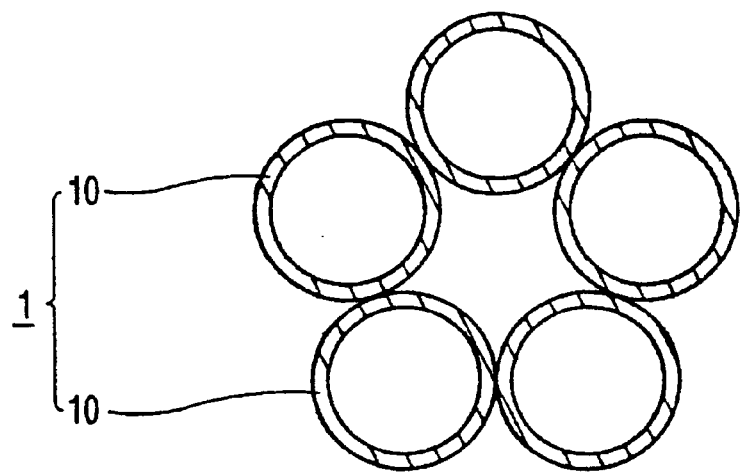
FIG. 4 is a cross sectional view of a bundle of pre-molded inner ducts separately extruded.
Figure 5:
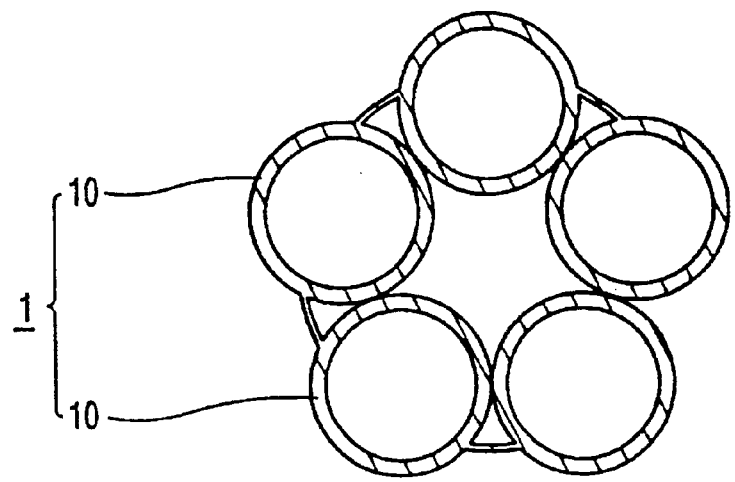
FIG. 5 is a cross sectional view of a bundle of pre-molded inner ducts connected by flexible connecting webs.
Figure 6:
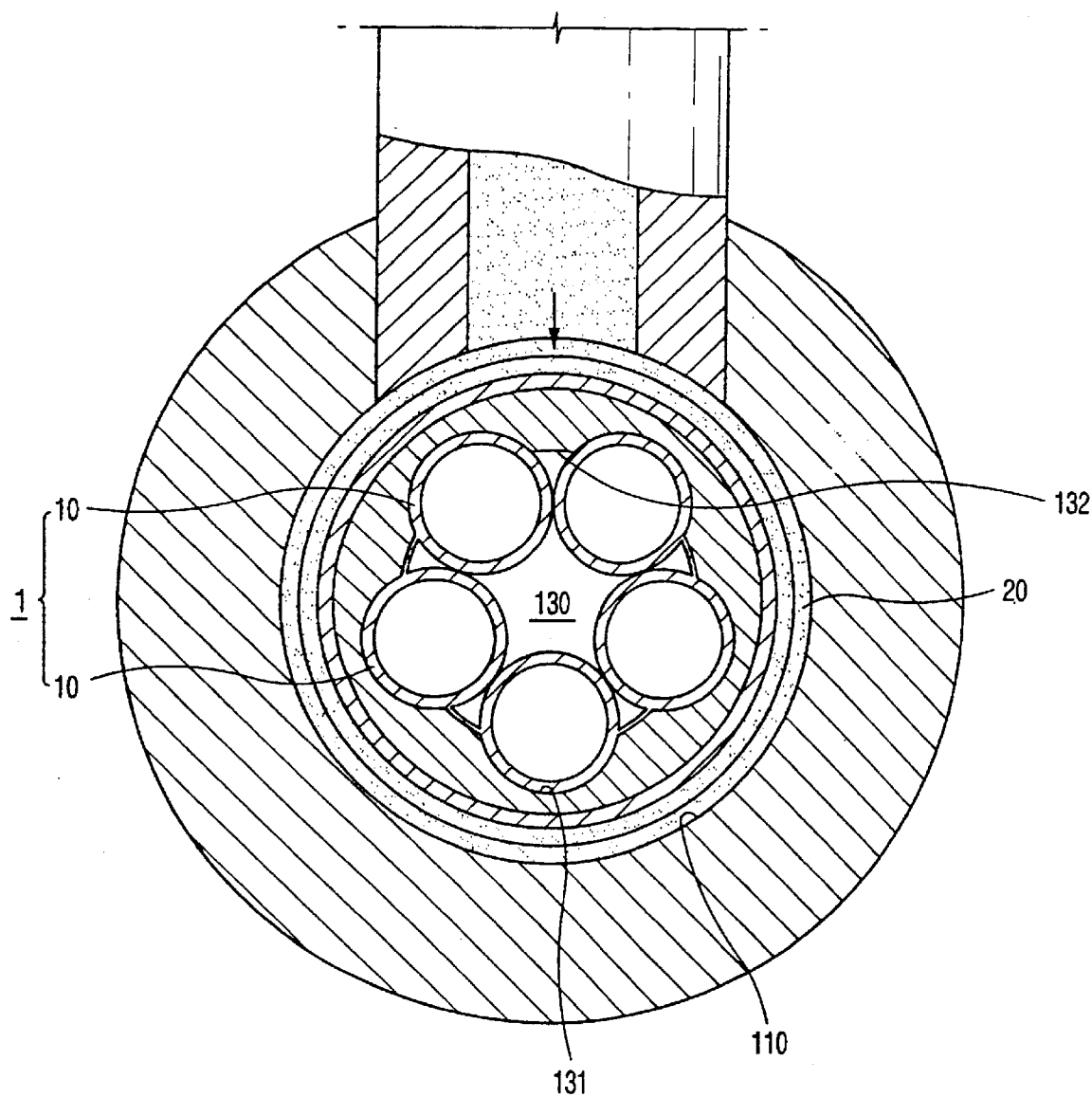
FIG. 6 is a sectioned view on a enlarged scale, on the line A—A in FIG. 1, illustrating the step of inserting a bundle of inner ducts.

It is preferable the inner ducts 10 are assembled or folded to form a tube bundle 1 in abutting contact with each other, in parallel, before the inner ducts are fed through the inner duct insertion passage 130. The tube bundle 1 may be formed by assembling of separately extruded inner ducts as shown FIG. 4, or by folding of inner ducts connected by flexible webs, as shown FIG. 5.

Figure 3:
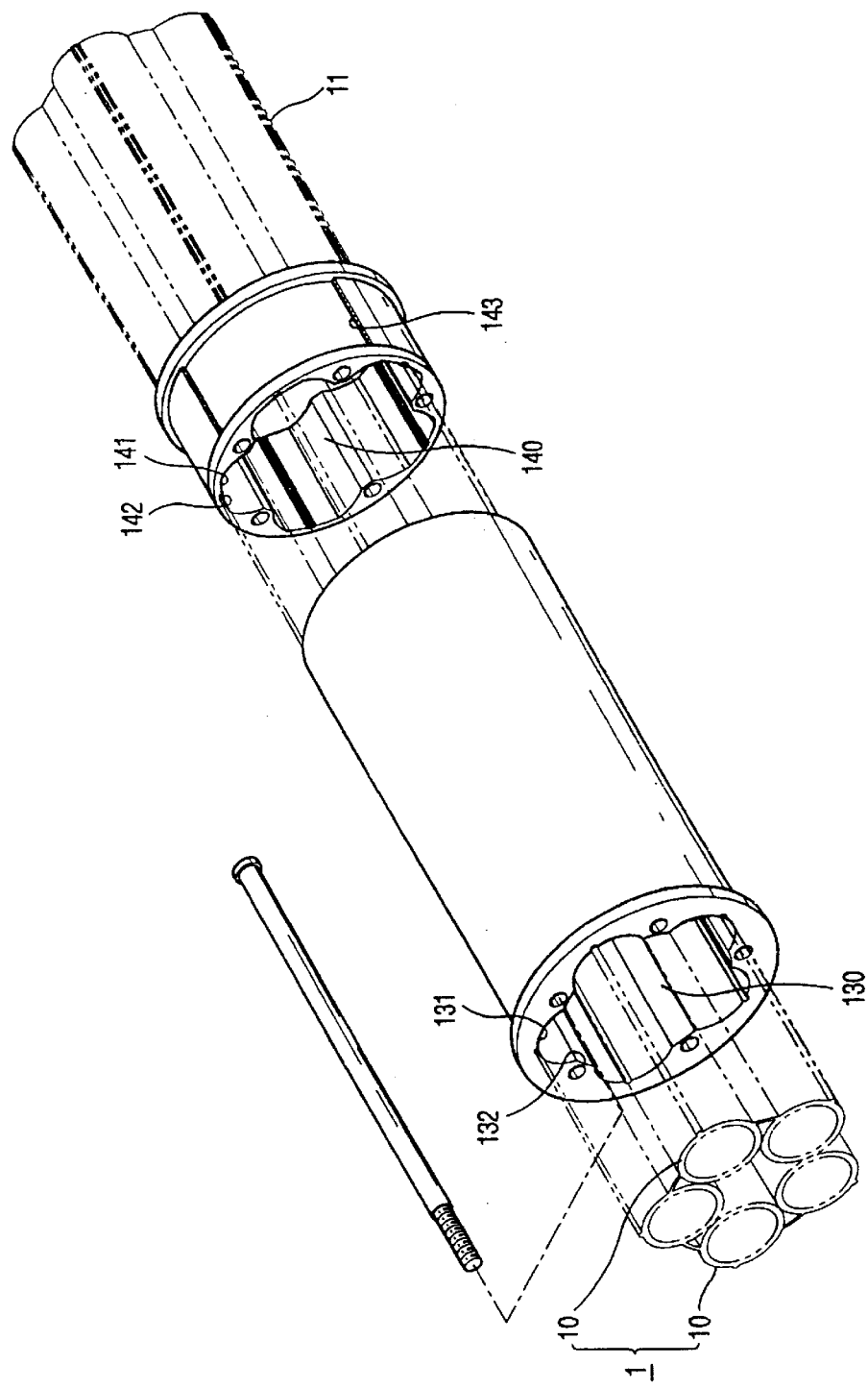
FIG. 3 is a perspective exploded view of the inner duct insertion passage and the rake passage, illustrating the steps of inserting and raking a bundle of inner ducts.
Figure 8:
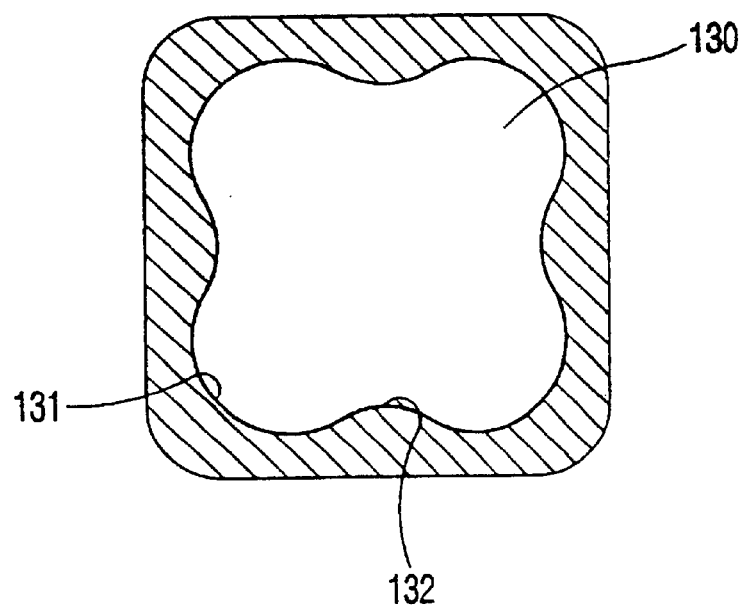
FIGS. 8, 9 and 10 are cross sectional views of various inner duct insertion passages having different cross sectional shapes.
Figure 9:
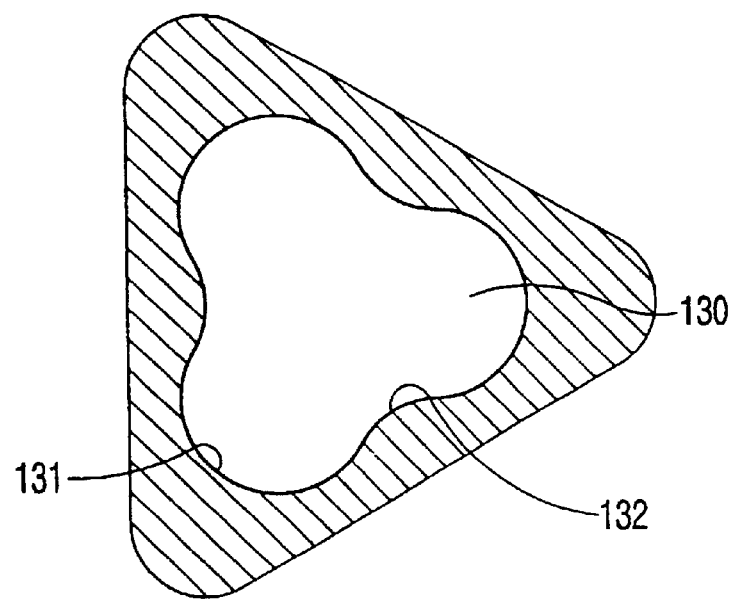
Figure 10:
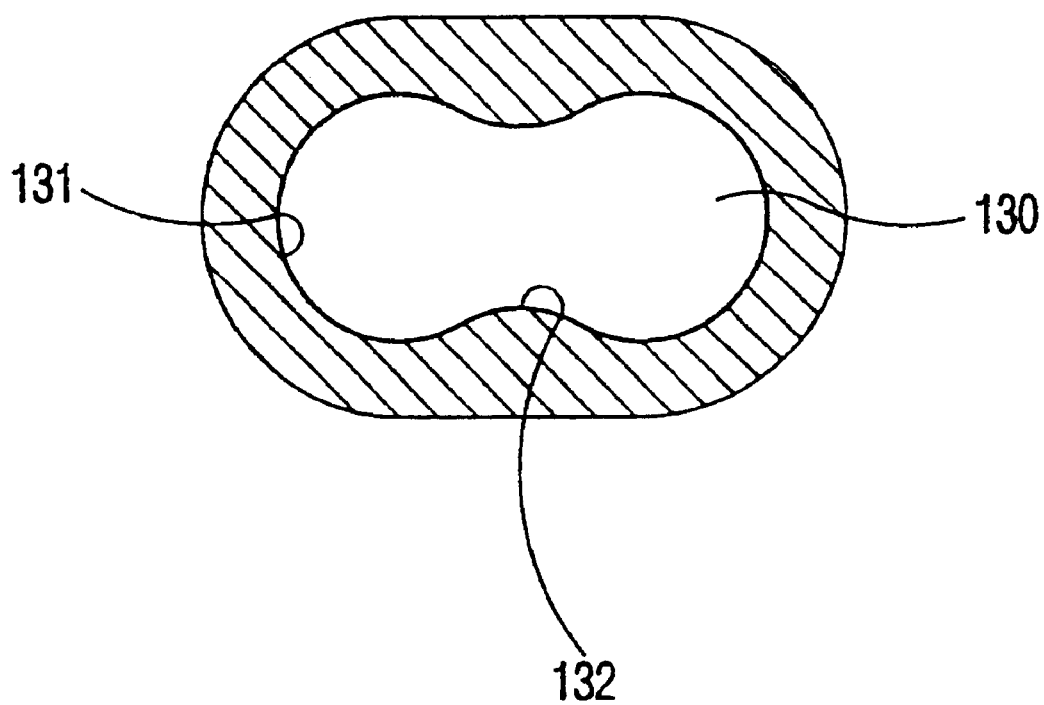

It is preferable that the inner duct insertion passage 130 has a cross sectional shape of a bundle outline, including a plurality of guide grooves 131 and guide ridges 132 which are contoured by a outline connecting peripheries of the inner ducts 10 in abutting contact with each other, in parallel as shown FIG. 3. This cross sectional shape of the inner duct insertion passage 130 serve to guide for a plurality of elongated inner ducts 10 to be inserted through the inner duct insertion passage 130 in parallel, contiguous relation each other. The cross sectional shape of the inner duct insertion passage 130 can be designed variously according to the bundle outlines contoured by bundles of inner ducts as shown FIGS. 8~10.

Figure 7:
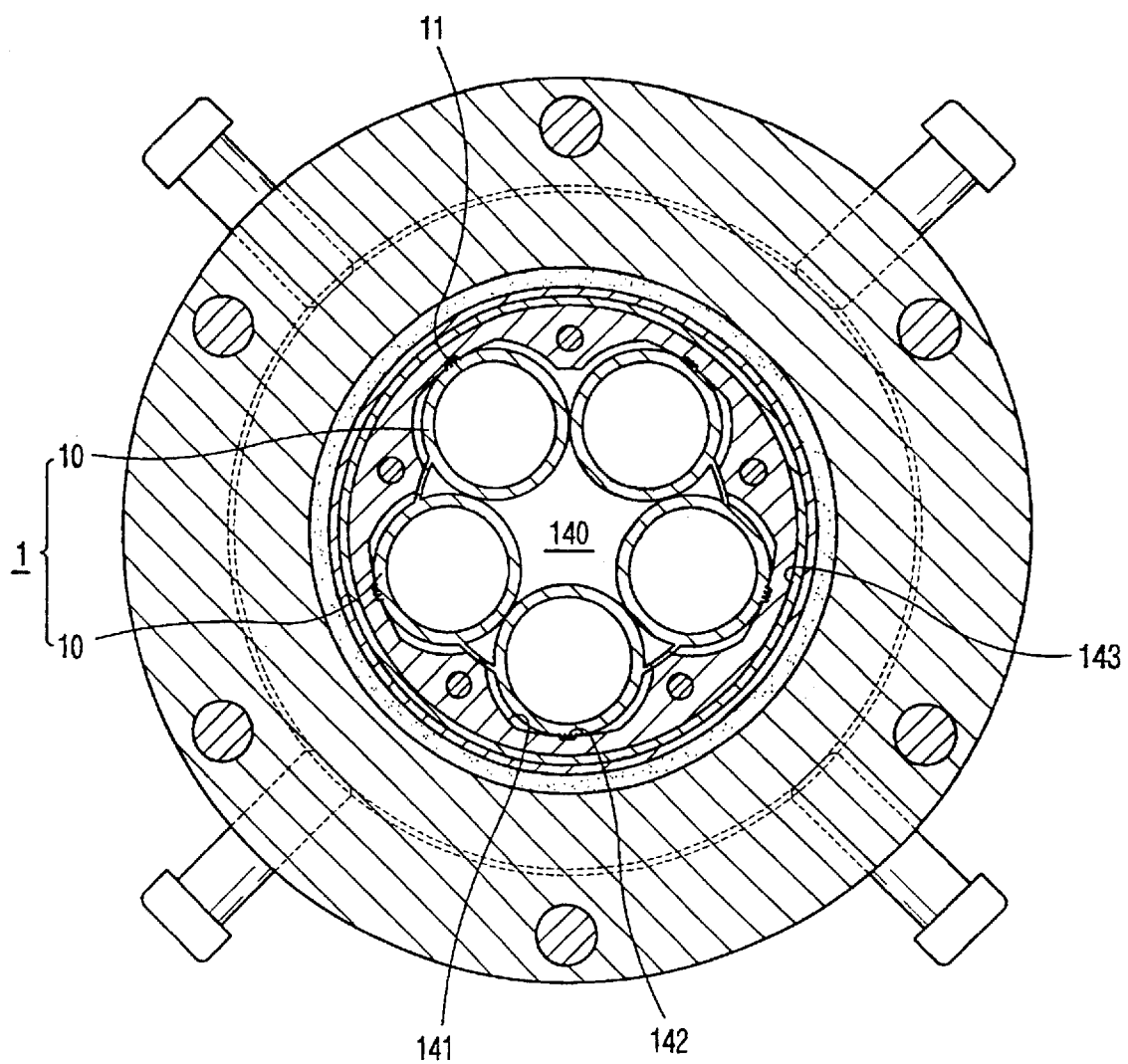
FIG. 7 is a sectioned view on a enlarged scale, on the line B—B in FIG. 1, illustrating the step of raking a bundle of inner ducts.

It is Preferable that a rake passage 140, which has the same cross sectional shape as the inner duct insertion passage 130 except having a plurality of rakes 142 protruded from their central portions of the guide grooves 141 toward a central axis, is connected to the exit end of the inner duct insertion passage 130 as shown in FIGS. 3 and 7.

It is also preferable that a heating means 143 for preheating the rake passage is installed on the outside of the rake passage 140 as shown FIG. 3. The rakes 142 and the heating means 143 serve to rake and preheat the outer peripheral surfaces of the inner ducts 10 passed through the inner duct insertion passage, thereby forming raked grooves 11 on the outer peripheral surfaces of the inner ducts 10.

Figure 16:
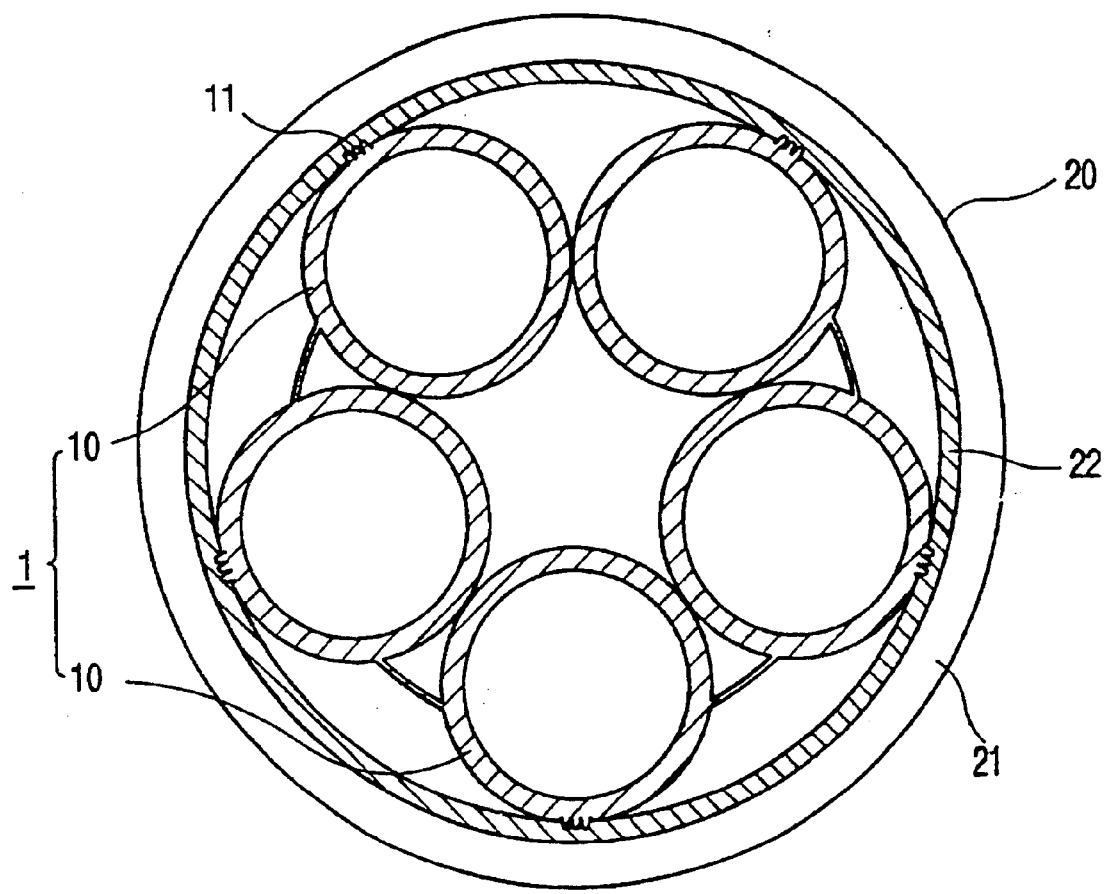
FIG. 16 is a cross sectional view of a multiple channel duct assembly manufactured by an apparatus and a method of the invention.

The raked grooves 11 make it easier for the melted. outer duct and the pre-molded inner ducts to be welded together at the portions which the troughs of the outer duct and the outer surfaces of the inner ducts are contacted together as shown FIG. 16.

Figure 2:
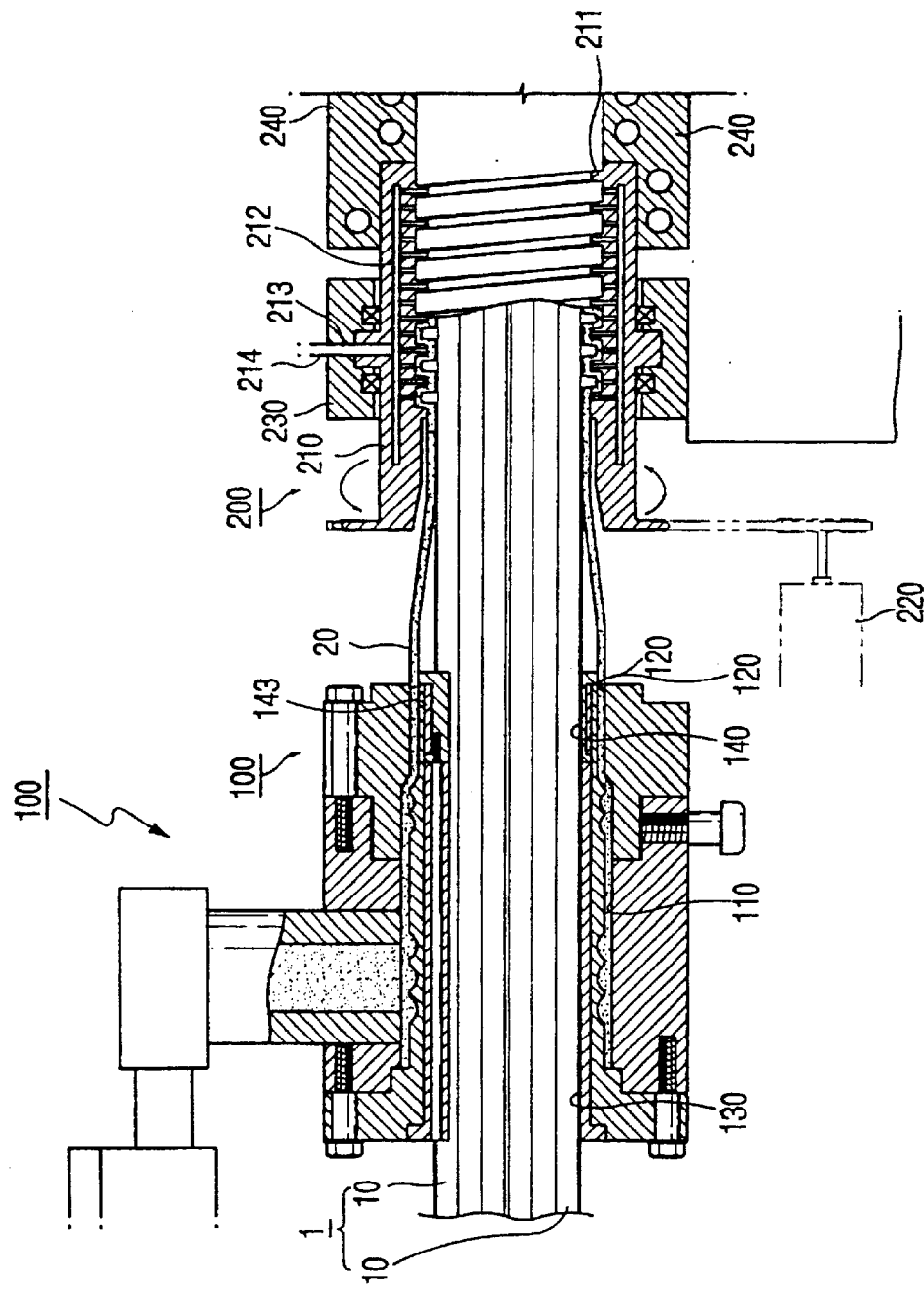
FIG. 2 is a partially sectional view of another apparatus according to another embodiment of the invention, illustrating a method of producing a multiple channel duct assembly.

The outer duct resin 20 immediately after it is extruded from the discharge port 120 of the cross-head die 100 is not in direct contact with the outer peripheral wall of the inner ducts 10 which emerges centrally from the cross-head die 100 as shown in FIGS. 1 and 2.

Before the pre-molded inner ducts 10 and the melted outer duct 20 discharged from the cross-head die 100 are fed to a molding means 200 as shown FIGS. 1 and 2, the outer peripheral surface of the outer duct 20 is cooled by ambient cooling air brought into contact therewith, changing the outer duct 20 from the melted state to a stabler softened state. The outer duct 20 is thus prevented from being excessively deformed due to its flowability.

As shown in FIGS. 1 and 2, the pre-molded inner ducts 10 and the softened outer duct 20 are continuously fed together into a molding means 200 with a corrugated tunnel. In this molding means 200, the softened outer duct 20 is configured, cooled and solidified to have the corrugated tubular section including a plurality of contiguous ridges 21 and troughs 22 extending over the entire length. The troughs 22 of the outer duct are configured to have contiguous relationship with the inner ducts 10 as shown FIG. 16. It is preferable that the outer duct 20 and the inner ducts 10 are welded together at the contiguous portions where the inside surfaces of the troughs 22 and the outer surfaces of the inner ducts 10 are contacted as shown FIG. 16. The raked grooves 11 make it easier for the inner ducts 10 and the melted outer duct 20 to be welded together at the portions which the troughs 22 of the outer duct and the outer surfaces of the inner ducts 10 are contacted together as shown FIG. 16.

The molding means 200 for molding a corrugated outer duct may be of any construction in so far as its mold 210 has the corrugated tunnel and also can cool and solidify the outer duct 20 while molding the softened outer duct to a corrugated tubular configuration. Although various types of molding means 200 have been disclosed for producing various types of corrugated plastic pipes, as a matter of convenience, two types of molding means are described below.

A type of molding means 200 for molding corrugated outer duct 20, as shown in FIG. 1, comprises a pair of complementary mold assemblies 210 each of which has an endless array of articulately interconnected mold blocks 1210; drive means 220 for driving the mold blocks 1210 of each mold assembly 210 in synchronism with the mold blocks 1210 of the other mold assembly 210 along a forward run, in which the mold blocks of mold assemblies are in cooperative inter-engagement to provide an axially extending corrugated tunnel, and back along a return run; a stationary suction chamber 230 which is connectable to a suction source being positioned to communicate with said corrugated tunnel, during movement of the mold blocks along the forward run; a stationary cooling chamber 240 which is connectable to a source of cooling fluid being positioned to communicate with said mold assemblies.

Figure 11:
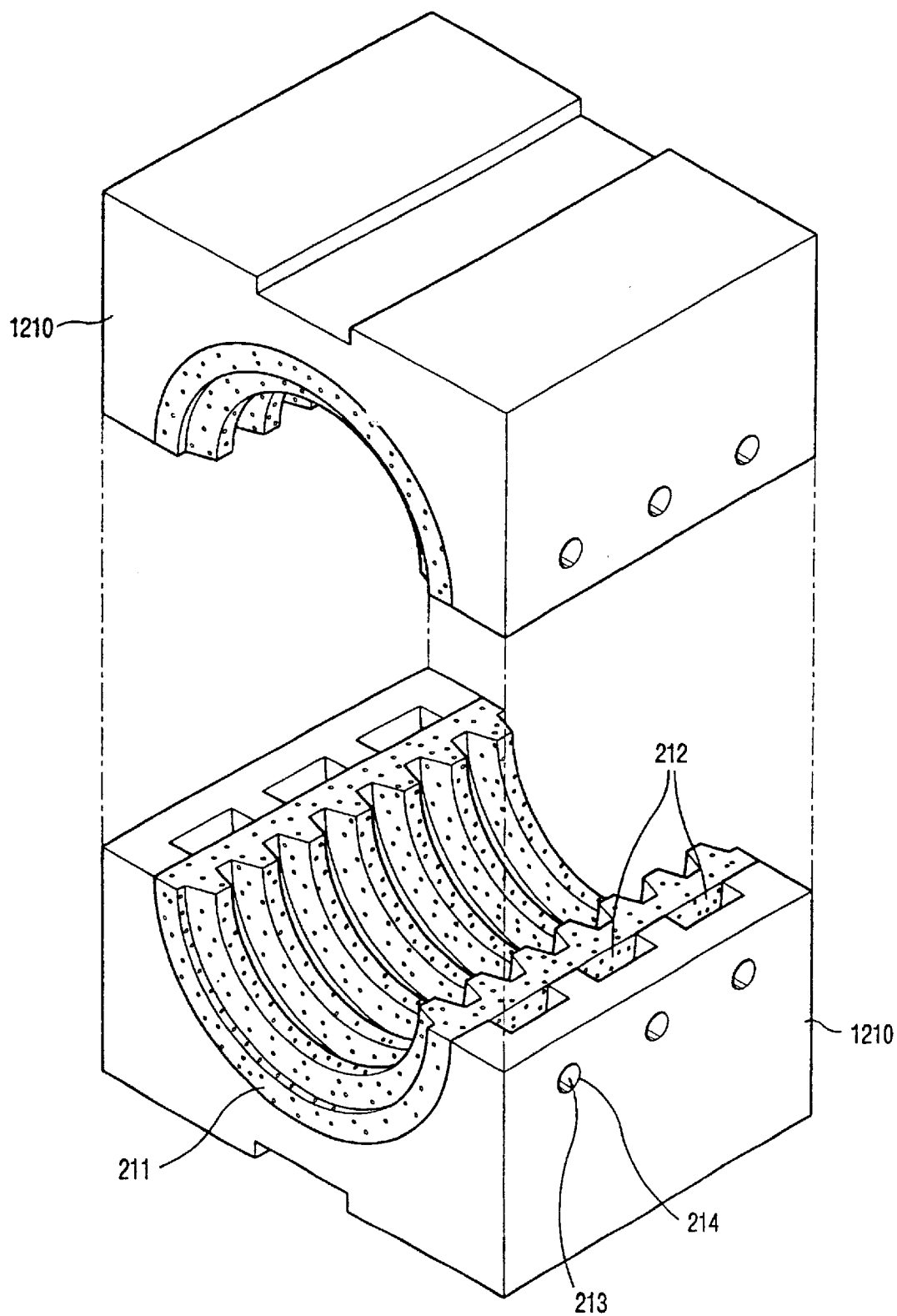
FIG. 11 is a perspective exploded view of a pair of the mold blocks incorporated in an apparatus according to an embodiment of the invention.
Figure 12:
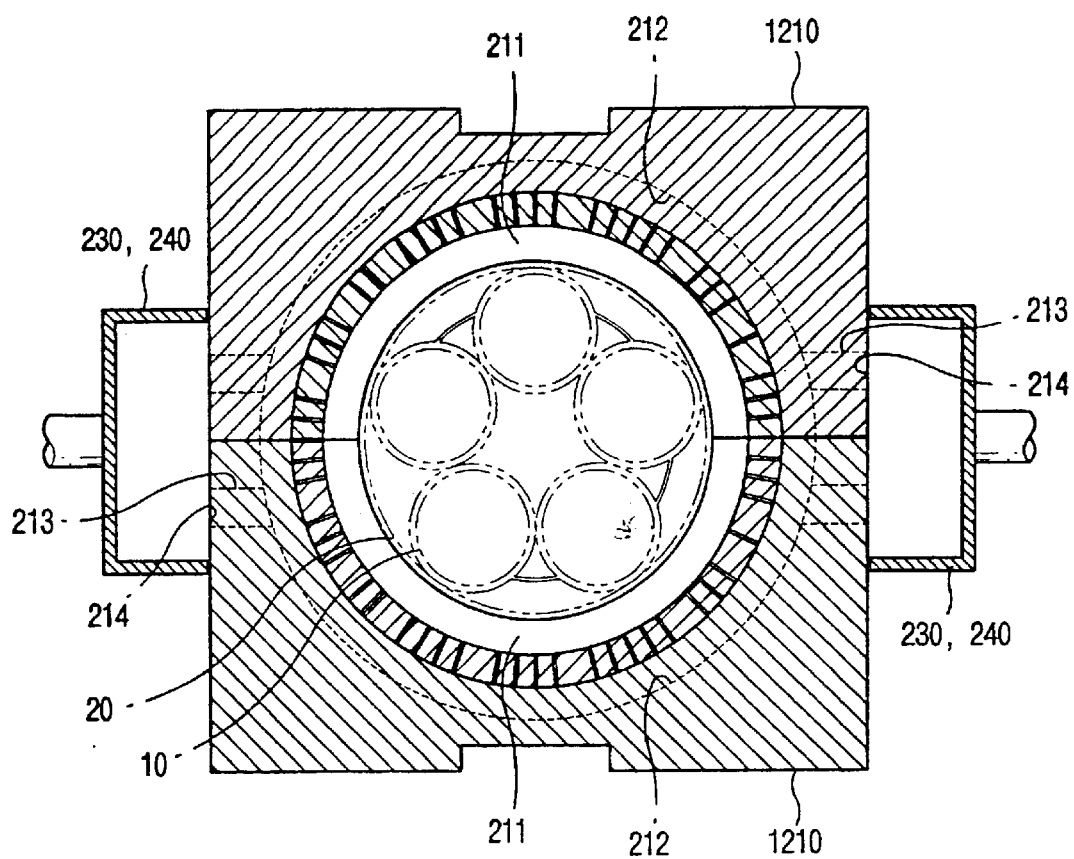
FIG. 12 is a cross sectional view of the mold with a round sectional corrugated tunnel incorporated in an apparatus according to an embodiment of the invention.

As shown in FIG. 11, each mold block 1210 includes an inner liner 211 which is of porous material to permit the passage of fluid such as air therethrough.

The inner face of the liner 211 is provided with corrugations, and channels 212 are provided behind the liner with these channels communicating through passages 213 with ports 214 in external faces of the mold block 1210.

Thus, the passages 213, the channels 212, the pores in the liner 211 together constitute suction passages which extend between the mold tunnel defining faces of the mold block 1210 and the ports 214 in the appropriate external faces of the block.

The other type of the molding means 200 for molding a corrugated outer duct 10, as shown in FIG. 2, comprises a round tubular mold 210 which is rotatably supported by a plurality of retainers and provided with an helically corrugated tunnel on its inside surface through its central axis; driving means 220 for driving the round tubular mold in the direction of rotation; a stationary suction chamber 230 which is connectable to a suction source being positioned to communicate with said corrugated tunnel, during rotation of said mold; a stationary cooling chamber 240 which is connectable to a source of cooling fluid being positioned to communicate with said mold.

As shown in FIG. 2, the round tubular mold 210 includes an inner liner 211 which is provided with appropriate apertures to permit the passage of fluid such as air therethrough. The inner face of the liner 211 is provided with corrugations, and channels 212 are provided behind the liner with these channels communicating through passages 213 with ports 214 in external faces of the mold 220. Thus, the passages 213, the channels 212, the apertures in the liner 211 together constitute suction passages which extend between the corrugated tunnel defining inner faces of the mold and the ports 214 in the appropriate external faces of the mold.

In the molding means 200 of the above structures, the softened outer duct 20 extruded from the cross-head die 100 is fed into the corrugated tunnel in the mold 210 and forcibly configured to the corrugated tunnel in the mold 210.

Since the channels 212 around the corrugated tunnel in the mold is evacuated, the outer duct 20 is attracted under suction through-the apertures against the corrugated tunnel while the outer duct is being moved therethrough.

The corrugated outer duct 20 is also cooled and solidified by the coolant flowing around the corrugated tunnel.

As a result, in the multiple channel duct assembly thus manufactured, the outer duct 20 is adjusted with accuracy to the inside configuration of the corrugated tunnel, and the inner surfaces of the troughs 22 of the outer duct 20 are directly contacted to or welded to the outer peripheral surfaces of the inner ducts 10. The coolent flowing around the molding die may be a cooling gas, cooling water, or the like.

Figure 13:
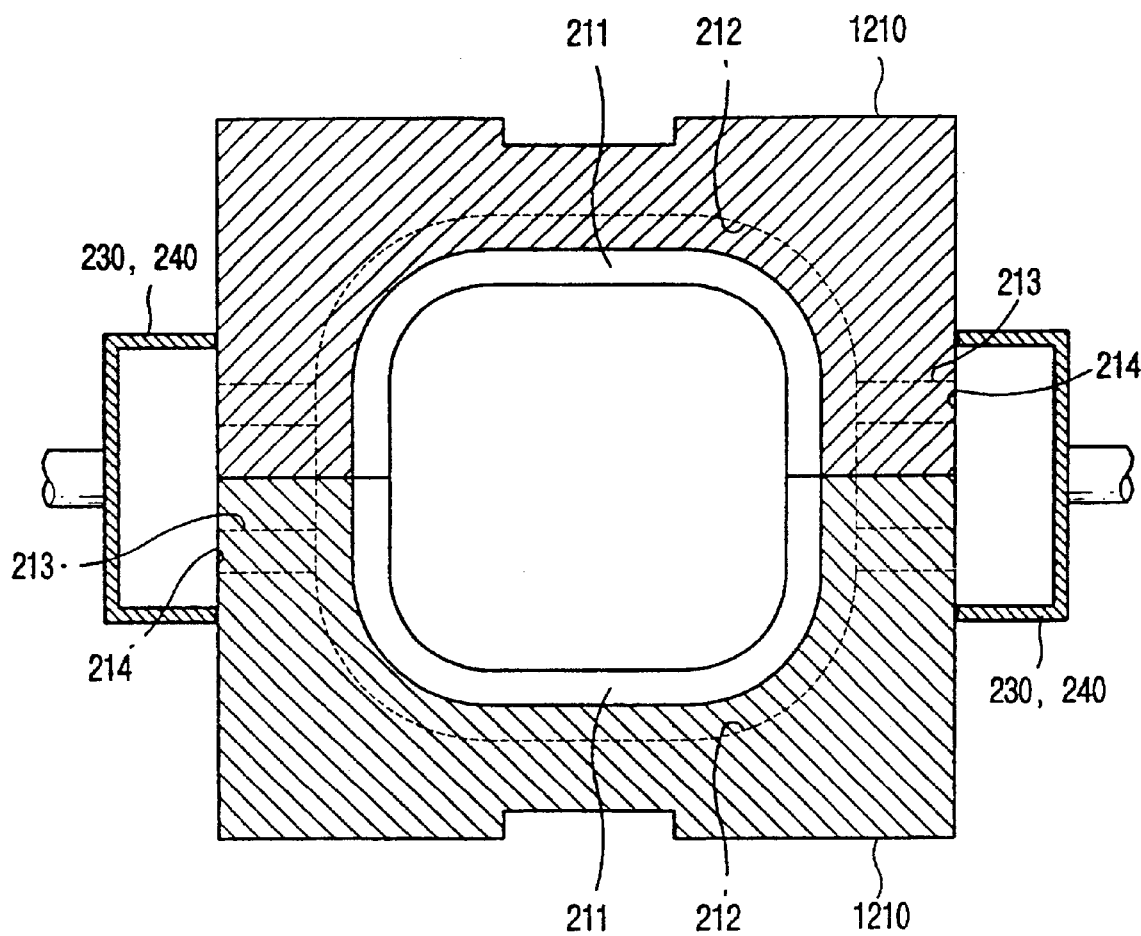
FIGS. 13, 14 and 15 are cross sectional views of molds with non-round sectional corrugated tunnels.
Figure 14:
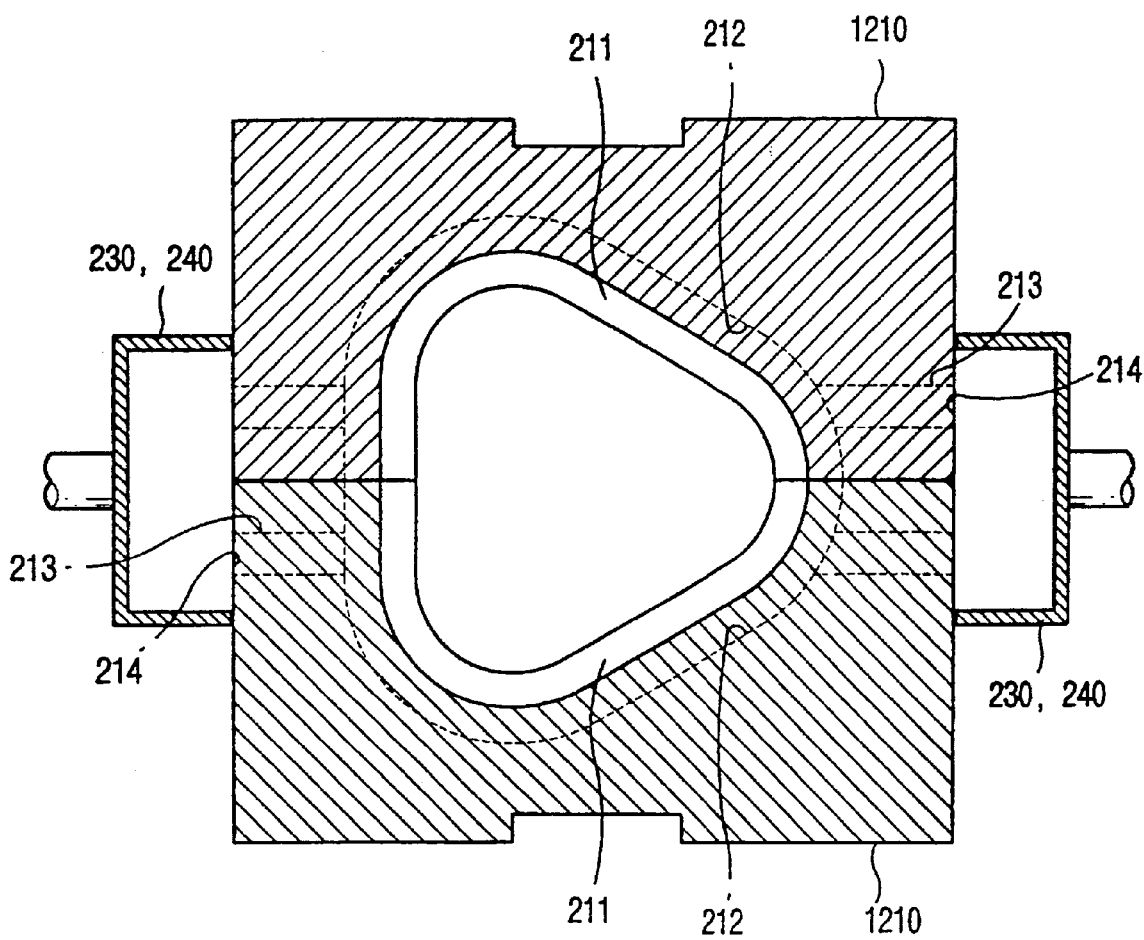
Figure 15:
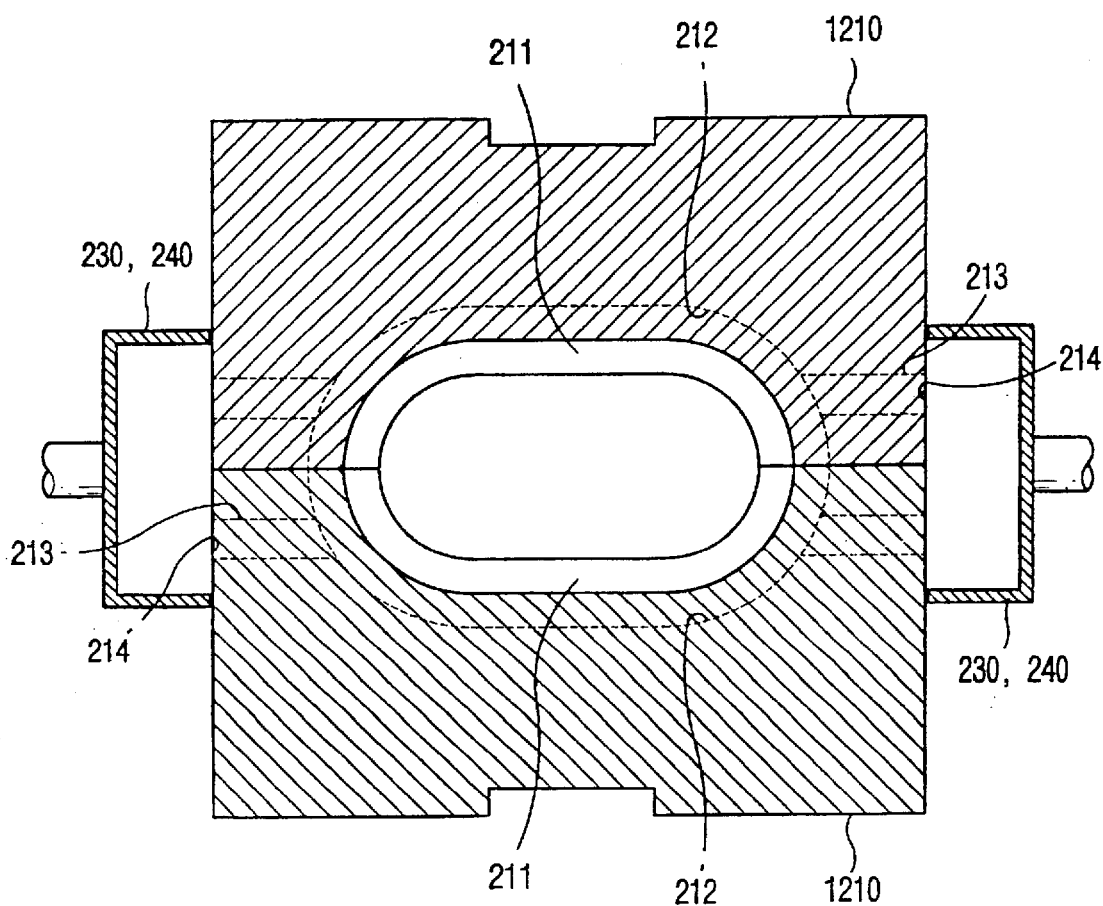

Although it is preferable that the mold 210 has a corrugated tunnel with a cross section of a regular, precisely circular configuration, it is possible that the mold has a corrugated tunnel with a cross section of helical configuration. It is also possible that the mold assembly 210 has a corrugated tunnel with such a cross section as quadrangle with round corners, triangle with round corners or ellipse as shown FIGS. 13~15.

The present invention resides in that a plurality of pre-molded inner ducts 10 are fed to a cross-head die 100, and a melted outer duct 20 is extruded around the inner ducts 10 from the cross-head die 100, and then the pre-molded inner ducts 10 and the melted outer duct 20 are supplied into the corrugated tunnel of a mold 210 in which a melted outer duct 20 is molded to have corrugations, thus producing a multiple channel duct assembly which includes a plurality of elongated inner ducts 10 and a corrugated outer duct 20 which encircles the inner ducts 10 over their entire length to retain them. This method of continuously manufacturing a multiple channel duct assembly by using an extrusion molding machine with a cross-head die 100 and a molding means 200 has not been known heretofore.

An example of a method of manufacturing a multiple channel duct assembly in accordance with the present invention will be described below.

Five pre-molded inner ducts 10 of polyethylene are assembled to form a tube bundle in abutting contact with each other, in parallel, before the inner ducts 10 are fed through the inner duct insertion passage 130 of the cross-head die 100, as shown FIGS. 1~3. The pre-molded inner ducts 100 are preheated and raked by their outer peripheral surfaces during passage through the inner duct insertion passage 130 in order to allow their outer peripheral surfaces to be easily welded to the troughs 22 of the corrugated outer duct 20 as shown FIG. 7. The bundle of elongate inner ducts 10 are continuously fed through the inner duct insertion passage 130, while the melted mass of polyethylene flowing from the outer duct resin passage 110 is being discharged from the discharge port 120 to extrude the outer duct 20 around the bundle of inner ducts 10 as shown in FIGS. 1~3.

As shown FIGS. 1~3, the pre-molded inner ducts 10 and the melted and softened outer duct 20 are continuously fed together into a vacuum-type mold 210 with a corrugated tunnel. In this mold 210, the softened outer duct 20 is configured, cooled and solidified to have the corrugated tubular section including a plurality of contiguous ridges 21 and troughs 22 extending over the entire length.

As shown FIG. 16, a multiple channel duct assembly, which is manufactured by an apparatus and a method in accordance with the present invention, comprises a plurality of inner ducts 10 which are in abutting contact with each other; and a corrugated outer duct 20 which encircles the inner ducts over their entire length to retain them in its contiguous relationship.

The multiple channel duct assembly manufactured by the method and apparatus in accordance with the present invention is also distinguished from prior arts, being applied for patent separately from this invention.

Therefore, the detailed description on the configuration of the multiple channel duct assembly manufactured by the present invention is omitted at this specification and drawings.

Although the present invention has been described in terms of specific embodiments, it is anticipated that alterations and modifications thereof will no doubt become apparent to those skilled in the art. It is therefore intended that the following claims be interpreted as covering all such alterations and modifications which fall within the true spirit and scope of the invention.

What is claimed is:

1. An apparatus for producing a multiple channel duct assembly includes:
   (a) a cross-head die having an outer duct resin passage and a discharge port capable of extruding a melted mass for a outer duct of hermoplastic resin, said cross-head die also having an inner duct insertion passage capable of feeding a plurality of pre-molded inner ducts, centrally through said outer duct resin passage; and
   (b) a molding means for molding corrugated outer duct, which comprises a mold with corrugated tunnel, drive means for driving said mold, a stationary suction chamber which is connectable to a suction source being positioned to communicate with said corrugated tunnel, and a stationary cooling chamber which is connectable to a source of cooling fluid being positioned to communicate with said mold assemblies;
   (c) wherein said inner duct insertion passage has a cross sectional shape of a bundle outline, including a plurality of guide grooves and a plurality of guide ridges which are contoured by a outline connecting the outer peripheral surfaces of said inner ducts inserted in abutting contact with each other, in parallel.

2. The apparatus for producing a multiple channel duct assembly of claim 1, further comprising a rake passage, which is connected to the exit end of said inner duct insertion passage and has the same cross sectional shape as said inner duct insertion passage except having a plurality of rakes protruded from their central portions of said guide grooves toward a central axis.

3. The apparatus for producing a multiple channel duct assembly of claim 2, further comprising a heating means for preheating the rake passage which is installed on the outside of said rake passage.

4. The apparatus for producing a multiple channel duct assembly of claim 1, wherein said mold is a pair of complementary mold assemblies with a corrugated tunnel each of which has an endless array of articulately interconnected mold blocks.

5. The apparatus for producing a multiple channel duct assembly of claim 1, wherein said mold is a round tubular mold which is rotatably supported by a plurality of retainers and provided with an helically corrugated tunnel on its inside surface through its central axis.

6. The apparatus for producing a multiple channel duct assembly of claim 1, wherein said corrugated tunnel has a substantially round cross sectional shape.

7. The apparatus for producing a multiple channel duct assembly of claim 1, wherein said corrugated tunnel has a substantially ellipsoid cross sectional shape.

8. The apparatus for producing a multiple channel duct assembly of claim 1, wherein said corrugated tunnel has a substantially triangular cross sectional shape with round corners.

9. The apparatus for producing a multiple channel duct assembly of claim 1, wherein said has corrugated tunnel a substantially quadrangular cross sectional shape with round corners.

10. A method of producing a multiple channel duct assembly includes the steps of:
   (a) assembling a plurality of pre-molded inner ducts to form a tube bundle in abutting contact with each other, in parallel,
   (b) continuously feeding said bundle of elongate inner ducts through a inner duct insertion passage, while melted mass of polyethylene flowing from a outer duct resin passage is being discharged from a discharge port to extrude the outer duct around said bundle of inner ducts
   (c) continuously feeding said pre-molded inner ducts and said melted outer duct together into a vacuum-type mold with a corrugated tunnel.
   (d) configuring, cooling and solidifing said melted outer duct to have a corrugated tubular section including a plurality of contiguous ridges and troughs extending over the entire length in said mold with a corrugated tunnel.

11. The method of producing a multiple channel duct assembly of claim 10 further includes the step of preheating said pre-molded inner ducts by their peripheral outer surfaces during passage of said inner duct insertion passage.

12. The method of producing a multiple channel duct assembly of claim 11 further includes the step of raking said pre-molded inner ducts by their peripheral outer surfaces during passage of said inner duct inserting passage.

\* \* \* \* \*